(12) United States Patent
Matsubara et al.

(10) Patent No.: US 8,283,834 B2
(45) Date of Patent: Oct. 9, 2012

(54) POWER GENERATING APPARATUS HAVING BALL BEARINGS

(75) Inventors: Naoteru Matsubara, Ichinomiya (JP); Katsuji Mabuchi, Gifu (JP); Yohko Naruse, Ichinomiya (JP); Hitoshi Hirano, Nishinomiya (JP); Makoto Izumi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 277 days.

(21) Appl. No.: 12/680,798

(22) PCT Filed: Oct. 3, 2008

(86) PCT No.: PCT/JP2008/068019
§ 371 (c)(1),
(2), (4) Date: Mar. 30, 2010

(87) PCT Pub. No.: WO2009/054251
PCT Pub. Date: Apr. 30, 2009

(65) Prior Publication Data
US 2011/0266915 A1 Nov. 3, 2011

(30) Foreign Application Priority Data
Oct. 25, 2007 (JP) ................. 2007-277054

(51) Int. Cl.
*H02N 1/06* (2006.01)
*H02N 1/00* (2006.01)
*H02K 41/02* (2006.01)
*H02K 41/03* (2006.01)
(52) U.S. Cl. .... 310/309; 310/90; 310/12.31; 310/12.01; 310/12.12; 310/12.25; 310/12.04

(58) Field of Classification Search .................. 310/309, 310/12.01–12.33; *H01N 1/06, 1/00*
See application file for complete search history.

(56) References Cited

U.S. PATENT DOCUMENTS

| 5,763,965 | A | * | 6/1998 | Bader ................ 310/12.06 |
| 2001/0028203 | A1 | * | 10/2001 | Kasahara et al. ........ 310/309 |
| 2002/0079747 | A1 | * | 6/2002 | Teramachi et al. ........ 310/12 |

(Continued)

FOREIGN PATENT DOCUMENTS
FR WO2007012663 * 2/2007
(Continued)

OTHER PUBLICATIONS
Machine translation of WO2007012663, Chaillout et al., Feb. 2007.*
(Continued)

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

A power generating apparatus (100) is provided with first substrates (2b, 2c) whereupon a first electrode (3) is arranged on one surface; a second substrate (1a) which includes a second electrode (6) arranged to face a first electrode on the one surface side of the first substrate; and sliding mechanisms (10, 11, 12, 13 and 14) arranged at least on the one surface side or the other surface side of the first substrate. The sliding mechanism holds the first substrate so that the first substrate moves relatively to the second substrate in a second direction (X direction) while suppressing movement of the first substrate in a first direction (Z direction).

17 Claims, 7 Drawing Sheets

U.S. PATENT DOCUMENTS

| | | | |
|---|---|---|---|
| 2003/0103703 A1* | 6/2003 | Ishiwada et al. | 384/531 |
| 2004/0007877 A1 | 1/2004 | Boland et al. | |
| 2005/0023547 A1 | 2/2005 | Hartwell et al. | |
| 2005/0258688 A1* | 11/2005 | Miyamoto et al. | 310/12 |
| 2006/0113862 A1* | 6/2006 | Suzuki et al. | 310/309 |
| 2007/0205674 A1* | 9/2007 | Tseng et al. | 310/14 |
| 2011/0070955 A1* | 3/2011 | Oh et al. | 464/146 |

FOREIGN PATENT DOCUMENTS

| | | |
|---|---|---|
| JP | 63-095861 A | 4/1988 |
| JP | 63-95861 A | 4/1988 |
| JP | 9-163761 A | 6/1997 |
| JP | 2005-52963 A | 3/2005 |
| JP | 2005-529574 A | 9/2005 |
| JP | 2005333756 * | 12/2005 |
| WO | WO 03/105167 A2 | 12/2003 |
| WO | WO 2009/054251 A1 | 4/2009 |

OTHER PUBLICATIONS

Machine translation of JP2005333756, Kosho et al., Dec. 2005.*
Partial translation of JP63095861, Kawakami et al., Apr. 1988.*
Written Opinion of the International Searching Authority for PCT/JP2008/068019, dated May 26, 2010, pp. 1-4.
International Search Report for PCT/JP2008/068019, dated Oct. 28, 2008, pp. 1-3.
Chinese Office Action dated Sep. 26, 2011 (with English summary) issued in corresponding Chinese Application No. 200880104247.0.

* cited by examiner

POWER GENERATING APPARATUS HAVING BALL BEARINGS

TECHNICAL FIELD

The present invention relates to a power generating apparatus, and more particularly, it relates to a power generating apparatus comprising a first substrate including a first electrode and a second substrate including a second electrode arranged to be opposed to the first electrode.

BACKGROUND ART

An electret power generating apparatus comprising a first substrate including a first electrode and a second substrate including a second electrode arranged to be opposed to the first electrode is known in general.

A conventional electret power generating apparatus disclosed in National Patent Publication Gazette No. 2005-529574 comprises a movable portion provided with an electrode having conductivity and a fixed portion provided with an electrode consisting of an electret material where charges are held. The electrodes provided on the movable portion and the fixed portion respectively are arranged to be opposed to each other, while the movable portion is supported to be held between spring members. The apparatus is so formed as to generate power by generating electrostatic induction between the opposed electrodes when the movable portion vibrates in a parallel direction with respect to the fixed portion.

In the conventional electret power generating apparatus disclosed in the aforementioned National Patent Publication Gazette No. 2005-529574, however, the movable portion is supported by the spring members and hence may move not only in a direction parallel to a surface on which the electrode is arranged but also in an orthogonal direction. In this case, the distance between the electrodes provided on the movable portion and the fixed portion respectively cannot be regularly kept constant, and hence there is such a problem that an electrostatic force acting between the electrodes changes and the quantity of power generation obtained in power generation becomes unstable.

DISCLOSURE OF THE INVENTION

The present invention has been proposed in order to solve the aforementioned problem, and an object of the present invention is to provide a power generating apparatus capable of obtaining a stable quantity of power generation.

In order to attain the aforementioned object, a power generating apparatus according to an aspect of the present invention comprises a first substrate provided with a first electrode on one surface, a second substrate including a second electrode arranged to be opposed to the first electrode on one surface side of the first substrate and a sliding mechanism provided on at least either one surface side or another surface side of the first substrate for retaining the first substrate to be relatively movable with respect to the second substrate in a second direction along one surface of the first substrate while inhibiting the first substrate from moving in a first direction orthogonal to the surface of the first substrate on which the first electrode is arranged.

BEST MODES FOR CARRYING OUT THE INVENTION

Embodiments of the present invention are now described with reference to the drawings.

(First Embodiment)

First, a power generating apparatus 100 according to a first embodiment of the present invention is described with reference to FIGS. 1 to 4.

Figure 1:
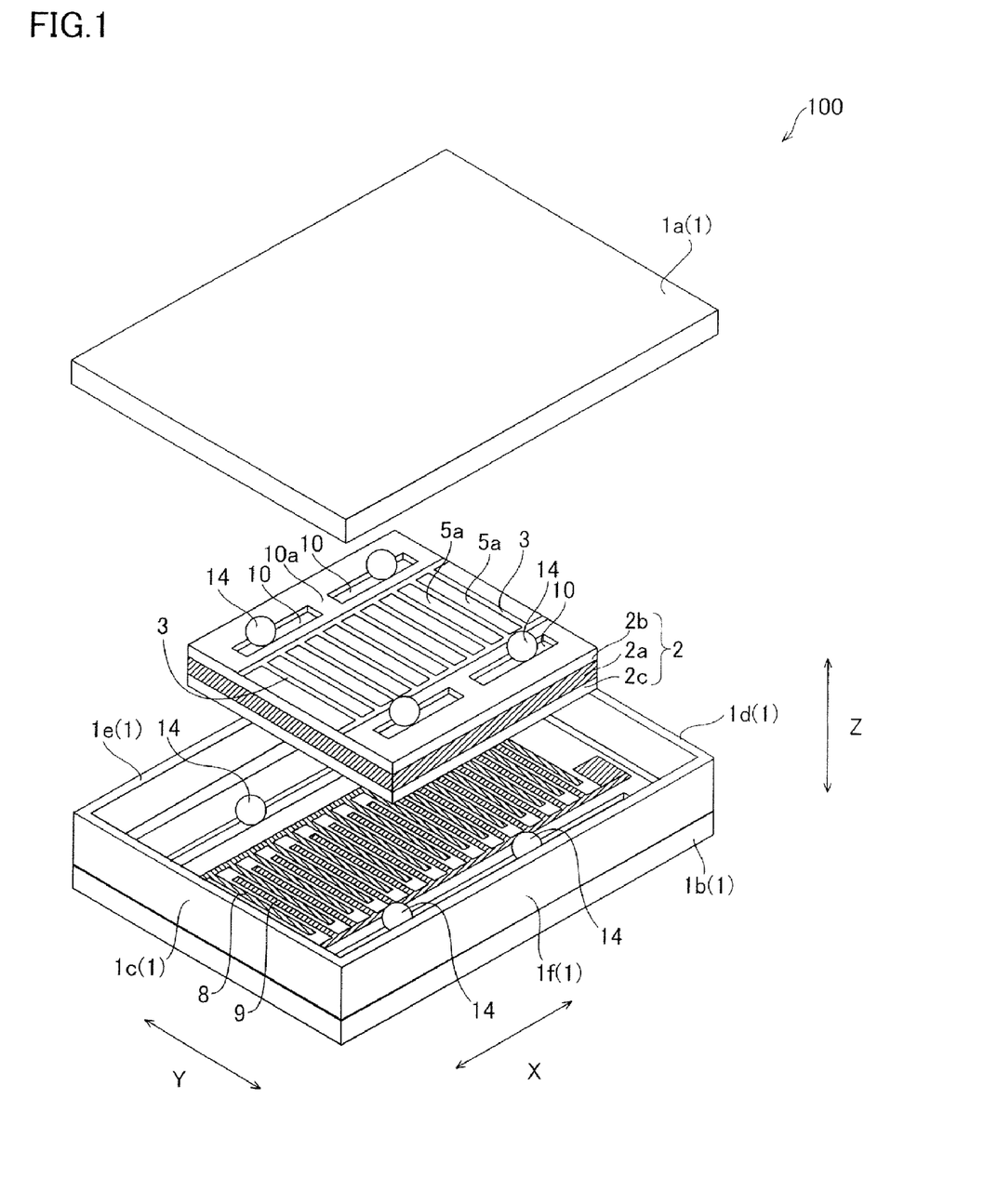
FIG. 1 A perspective view showing a power generating apparatus according to a first embodiment of the present invention.
Figure 2:
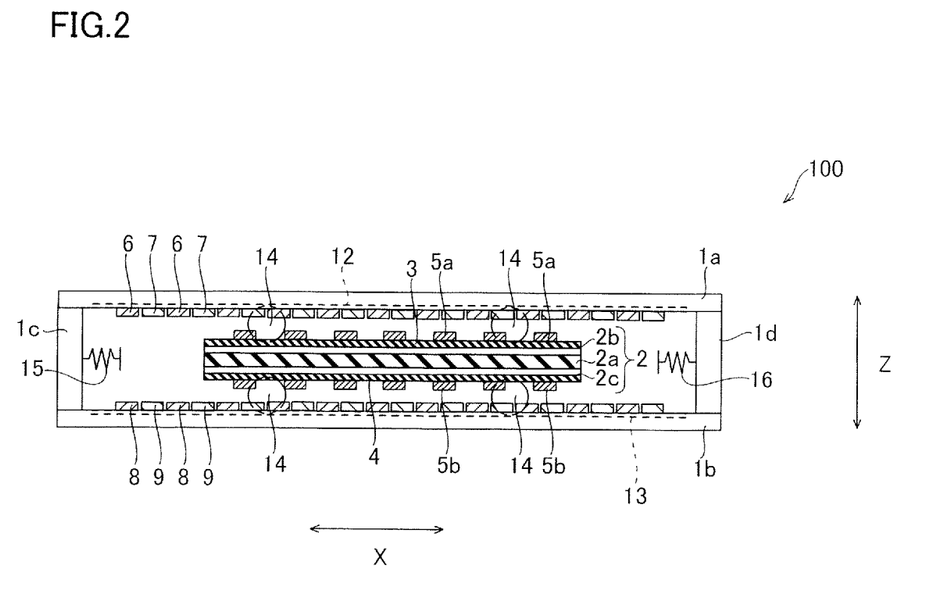
FIG. 2 A sectional view of the power generating apparatus according to the first embodiment shown in FIG. 1 as viewed from a direction Y.
Figure 3:
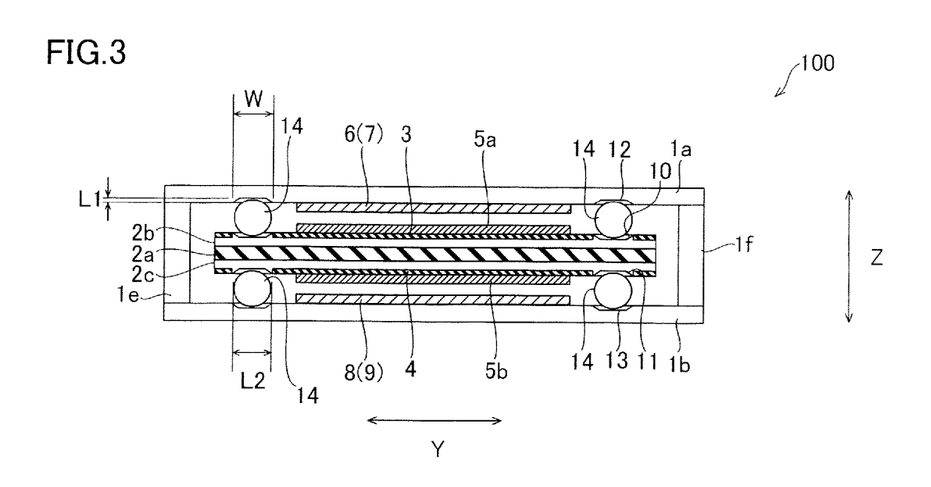
FIG. 3 A sectional view of the power generating apparatus according to the first embodiment shown in FIG. 1 as viewed from a direction X.

The power generating apparatus 100 according to the first embodiment of the present invention comprises a fixed portion 1 and a movable portion 2 slidingly movable with respect to the fixed portion 1 in a direction X, as shown in FIGS. 1 to 3. The fixed portion 1 includes an upper substrate 1a, a lower substrate 1b, sidewall portions 1c and 1d opposed to each other, and sidewall portions 1e and 1f. The upper substrate 1a and the lower substrate 1b are examples of the "second substrate" and the "third substrate" in the present invention respectively. The direction X is an example of the "second direction" in the present invention.

The movable portion 2 includes a plate member 2a and movable substrates 2b and 2c arranged on one surface side and another surface side of the plate member 2a respectively and formed to be integrally movable with the plate member 2a. The movable substrates 2b and 2c are examples of the "first substrate" in the present invention. Electrets 3 and 4 semipermanently holding constant charges are formed on the surfaces of the movable substrates 2b and 2c respectively. The electret 3 is an example of the "first electrode" or the "first electrode portion" in the present invention, while the electret 4 is an example of the "fourth electrode". Guard electrodes 5a and 5b extending in a direction Y and plurally arranged along the direction X at prescribed intervals are arranged on the surfaces of the electrets 3 and 4 respectively. The guard electrodes 5 and 5b are grounded.

Collecting electrodes 6 and 7 are formed on the upper substrate 1a of the fixed portion 1. Similarly, collecting electrodes 8 and 9 are formed on the lower substrate 1b. The collecting electrodes 6 and 7 have functions of inducing charges by electrostatic induction between the same and the electret 3 of the movable substrate 2b, while the collecting electrodes 8 and 9 have functions of inducing charges by electrostatic induction between the same and the electret 4 of the movable substrate 2c. The collecting electrodes 6 and 7 are constituted of electrode portions 6a and 7a having functions of inducing charges and coupling portions 6b and 7b coupling the respective electrode portions 6a and 7a with each other. Similarly, the collecting electrodes 8 and 9 are constituted of electrode portions 8a and 9a and coupling portions 8b and 9b (see FIG. 4). The respective coupling portions 6b, 7b, 8b and 9b have functions of supplying charges induced by the respective electrode portions 6a, 7a, 8a and 9a respectively to loads (not shown). The collecting electrode 6 is an example of the "second electrode" in the present invention, while the electrode portions 6a are the "second electrode portions" in the present invention. The collecting electrode 7 is an example of the "fifth electrode" in the present invention, while the collecting electrodes 8 and 9 are examples of the "third electrode" in the present invention respectively.

Figure 4:
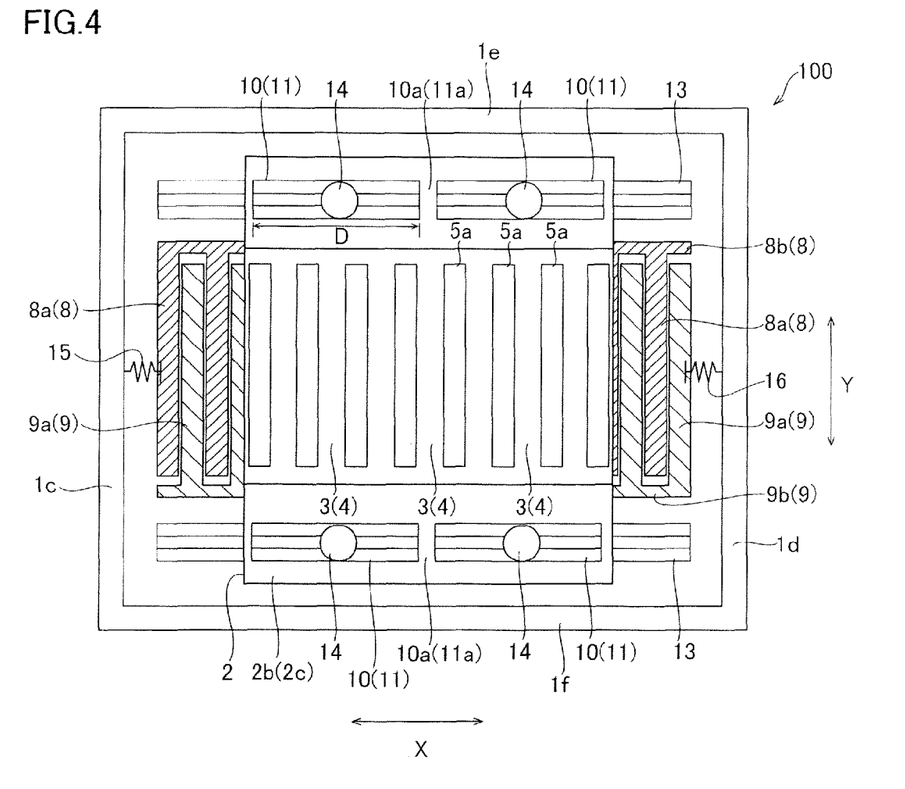
FIG. 4 A plan view of a fixed portion according to the power generating apparatus in the first embodiment of the present invention in a state removing an upper substrate.

The movable substrate 2b is provided with a pair of groove portions 10 to extend in the direction X, for holding the region where the electret 3 and the guard electrodes 5a are arranged therebetween in plan view, as shown in FIGS. 3 and 4. Similarly, the movable substrate 2 is provided with a pair of groove portions 11 to extend in the direction X, for holding the region where the electret 4 and the guard electrodes 5b are arranged therebetween. In the upper substrate 1a of the fixed portion 1, groove portions 12 are provided to extend in the direction X on positions opposed to the groove portions 10 of the movable substrate 2b respectively. Similarly in the lower side substrate 1b of the fixed portion 1, groove portions 13 are provided to extend in the direction X on positions opposed to the groove portions 11 of the movable substrate 2c respectively. The groove portions 10 and 11 of the movable portion 2 are examples of the "first groove portion" and the "second groove portion" in the present invention respectively, while the groove portions 12 of the upper substrate 1a of the fixed portion 1 and the groove portions 13 of the lower substrate 1b are examples of the "third groove portion" and the "fourth groove portion" in the present invention respectively.

The groove portions 10 of the movable substrate 2b and the groove portions 12 of the upper substrate 1a as well as the groove portions 11 of the movable substrate 2c and the groove portions 13 of the lower substrate 1b arranged to be opposed to each other respectively are provided on positions overlapping each other on the same lines in plan view respectively. Ball bearings 14 are arranged between the groove portions 10 of the movable substrate 2b and the groove portions 12 of the upper substrate 1a and between the groove portions 11 of the movable substrate 2c and the groove portions 13 of the lower substrate 1b respectively. Thus, the movable portion 2 is retained to be slidingly movable in the direction X (direction where the respective groove portions extend) in the state held between the upper substrate 1a and the lower substrate 1b of the fixed portion 1 through the respective ball bearings 14. In other words, sliding mechanisms for slidingly moving the movable portion 2 with respect to the fixed portion 1 in the direction X are constituted of the groove portions 10 and 11 of the movable portion 2, the groove portions 12 of the upper substrate 1a, the groove portions 13 of the lower substrate 1b and the ball bearings 14.

Regulating portions 10a for regulating the moving range of the ball bearings 14 are provided on end portions of the groove portions 10 of the movable substrate 2b on central sides in the direction X in plan view, and each groove portion 10 is in such a structure that the groove portion is divided into two in the direction X at the corresponding regulating portion 10a. Similarly, regulating portions 11a are provided also on end portions of the groove portions 11 of the movable substrate 2c on central sides. The ball bearings 14 are arranged in the divided respective groove portions 10 and 11. Due to the aforementioned structure, the respective ball bearings 14 are formed to be movable by the distance D from the regulating portions 10a of the groove portions 10 to end portions on the opposite sides, and the movable portion 2 is formed to be slidingly movable by the distance D in the direction X as a result. The regulating portions 10a and 11a are examples of the "movement regulating portion" in the present invention respectively.

The movable portion 2 is retained to be held between the upper substrate 1a and the lower substrate 1b through the ball bearings 14 from a direction Z, whereby the movable portion 2 is formed to be inhibited from moving in the direction Z. The direction Z is an example of the "first direction" in the present invention.

The depth L1 from bottom portions to opening end portions of the respective groove portions 10, 11, 12 and 13 has a magnitude of about 130 μm. Further, the respective groove portions 10, 11, 12 and 13 are so formed that the width thereof enlarges from the bottom portions toward the opening end portions respectively. More specifically, the width W between the opening end portions has a magnitude of about 350 μm while the ball bearings 14 have a diameter of about 300 μm, and the magnitude between the opening end portions of the respective ones of the groove portions 10, 11, 12 an 13 is formed to be larger than the diameter of the ball bearings 14. The bottom portions of the respective groove portions 10, 11, 12 and 13 have a width smaller than the diameter of the ball bearings 14, and are formed to be in contact with the ball bearings 14.

The sidewall portions 1c and 1d of the fixed portion 1 are provided with spring members 15 and 16 receiving the movable portion 2 slidingly moving in the fixed portion 1 and applying elastic forces in directions (directions toward a central portion) separating from the sidewall portions 1c and 1d respectively to the movable portion 2.

Figure 5:
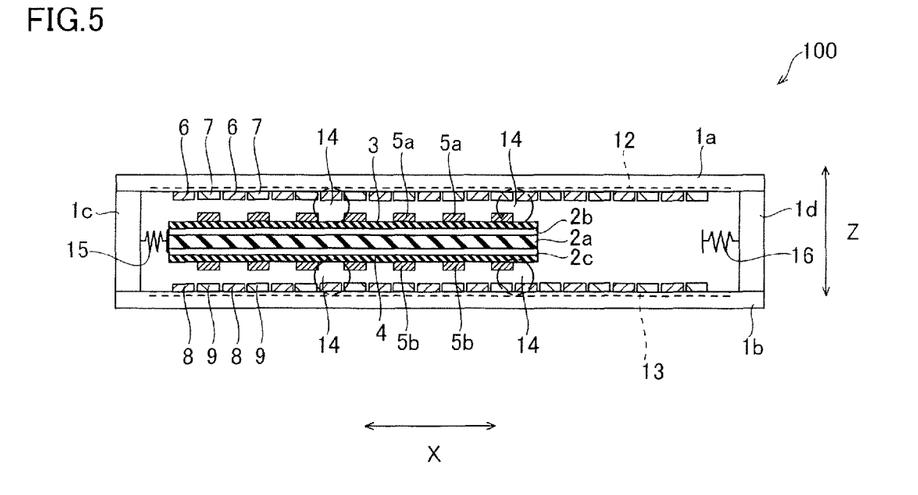
FIG. 5 A sectional view for illustrating a power generating operation of the power generating apparatus according to the first embodiment of the present invention.

A power generating operation of the power generating apparatus 100 according to the first embodiment of the present invention is now described with reference to FIGS. 2 and 5.

First, electrostatic induction is generated between the electret 3 and the collecting electrodes 6 and 7 opposed to each other and between the electret 4 and the collecting electrodes 8 and 9 respectively in a state where the movable portion 2 is at a standstill in the fixed portion 1 as shown in FIG. 2, whereby charges are induced in the collecting electrodes 6, 7, 8 and 9. Then, the power generating apparatus 100 is so vibrated in the direction X that the movable portion 2 slidingly moves in the direction X along the respective groove portions 10, 11, 12 an 13, as shown in FIG. 5. At this time, the electrets 3 and 4 perform parallel translation with respect to the collecting electrodes 6, 7, 8 and 9, whereby the quantity of the charges having been induced in the respective collecting electrodes by electrostatic induction fluctuates. Consequently, a potential difference is caused by the change in the quantity of charges so that power generation is performed. The aforementioned "parallel translation" also includes a case where the electrets 3 and 4 and the collecting electrodes 6, 7, 8 and 9 substantially parallelly move to such an extent that the same do not come into contact with each other.

According to the first embodiment, as hereinabove described, the sliding mechanisms constituted of the groove portions 10, 11, 12 and 13 and the ball bearings 14 arranged in the respective groove portions 10, 11, 12 and 13 are provided on both surfaces of the movable portion 2 and the movable portion 2 is formed to be slidingly movable in the direction X so that the movable portion 2 can be vibrated in the direction X while keeping the distances between the electrets 3 and 4 of the movable portion 2 and the collecting electrodes 6, 7, 8 and 9 of the fixed portion 1 in the direction Z regularly constant, whereby a stable quantity of power generation can be obtained.

According to the first embodiment, the movable portion 2 is retained to be held between the upper substrate 1a and the lower substrate 1b from the direction Z through the ball bearings 14, whereby the movable portion 2 can be reliably inhibited from moving in the direction Z. Therefore, a circuit can be inhibited from shorting due to contact between the electret 3 and the collecting electrodes 6 and 7 opposed to each other and between the electret 4 and the collecting electrodes 8 and 9.

According to the first embodiment, the ball bearings 14 are arranged between the groove portions 10 and the groove portions 12 opposed to each other and between the groove portions 11 and the groove portions 12, whereby resistance in the sliding movement of the movable portion 2 can be reduced by the ball bearings 14 arranged between the respective groove portions.

According to the first embodiment, the groove portions 10 and the groove portions 11 provided on the movable substrates 2b and 2c respectively are provided with the regulating portions 10a and 11a for regulating the moving range of the movable portion 2 with respect to the fixed portion 1 so that movement of the ball bearings 14 is regulated by the regulating portions 10a and 11a in a case where vibrational energy larger than desired vibrational energy is transmitted to the movable portion 2 when an apparatus body is vibrated, for example, whereby the moving range of the movable portion 2 can be controlled as a result. Therefore, breakage of the power generating apparatus 100 can be suppressed even if energy exceeding the prescribed vibrational energy is transmitted to the movable portion 2.

According to the aforementioned first embodiment, the groove portions 10, 11, 12 and 13 are so formed that the width thereof enlarges from the bottom portions toward the opening end portions respectively while the width W between the opening end portions is formed to be larger than the diameter L2 of the ball bearings 14, whereby clearance regions can be provided with respect to the ball bearings 14 in the vicinity of the opening end portions including inner side surfaces of the respective groove portions 10, 11, 12 and 13 while retaining the ball bearings 14 on the bottom portions of the respective groove portions 10, 11, 12 and 13. Therefore, an impact applied to the movable portion 2 from a direction other than the direction X when the power generating apparatus 100 vibrates in the direction other than the direction X can be absorbed, whereby a breakdown of the power generating apparatus 100 can be suppressed.

According to the first embodiment, a power generating portion where power generation is performed by the electret 3 and the collecting electrodes 6 and 7 is provided on one surface side (movable substrate 2b side) of the movable portion 2 while another power generating portion consisting of the electret 4 and the collecting electrodes 8 and 9 is provided on another surface side (movable substrate 2c side), whereby the quantity of power generation can be further increased as compared with a case of providing a power generating portion only on one surface side. In this case, the electrets 3 and 4 are arranged on both surfaces of the movable portion 2, whereby an electrostatic force is generated so that the electret 3 (movable substrate 2b side) and the collecting electrodes 6 and 7 (upper substrate 1b side) attract each other on one surface side of the movable portion 2 while an electrostatic force is generated so that the electret 4 (movable substrate 2c side) and the collecting electrodes 8 and 9 (lower substrate 1c side) also attract each other on another surface side of the movable portion 2. Thus, these electrostatic forces in directions opposite to each other cancel each other in the movable portion 2, whereby frictional force acting on the movable portion 2 due to the electrostatic forces can be reduced. Consequently, the quantity of power generation can be further increased. Further, the aforementioned electrostatic forces applied to the movable portion 2 are so mutually canceled that internal stress applied to the overall power generating apparatus 100 can be reduced, whereby breakage of the power generating apparatus 100 can be suppressed.

According to the first embodiment, a high quantity of power generation can be regularly obtained for the following reason: In other words, in such a conventional power generating apparatus that a movable portion is supported only by springs, a specific resonance frequency exists due to the relation between the spring constant of the springs and the weight of the movable portion and the quantity of movement of the movable portion is reduced in vibration at a frequency other than the resonance frequency, and hence only a low quantity of power generation is obtained. Further, harder springs (springs having a high spring constant) are required in order to strongly support the movable portion, and hence the apparatus may be adaptable to only a high frequency of at least 100 Hz, for example. According to the first embodiment, on the other hand, the movable portion 2 is slidingly movably supported by the ball bearings 14, whereby a high quantity of power generation can be regularly obtained regardless of the relation between the spring constant and the weight of the movable portion 2. In this case, further, it is possible to arbitrarily select the spring constant of the spring members 15 and 16 not supporting the movable portion 2, and the power generating apparatus 100 capable of obtaining a high quantity of power generation can be easily obtained by selecting the spring members 15 and 16 of a spring constant corresponding to a vibrational energy source or the utilization situation. According to this structure, further, it is also possible to cope with vibration resulting from a low frequency (not more than about 10 Hz) corresponding to natural movement of a human, for example, having been difficult in the conventional power generating apparatus.

(Second Embodiment)

Figure 6:
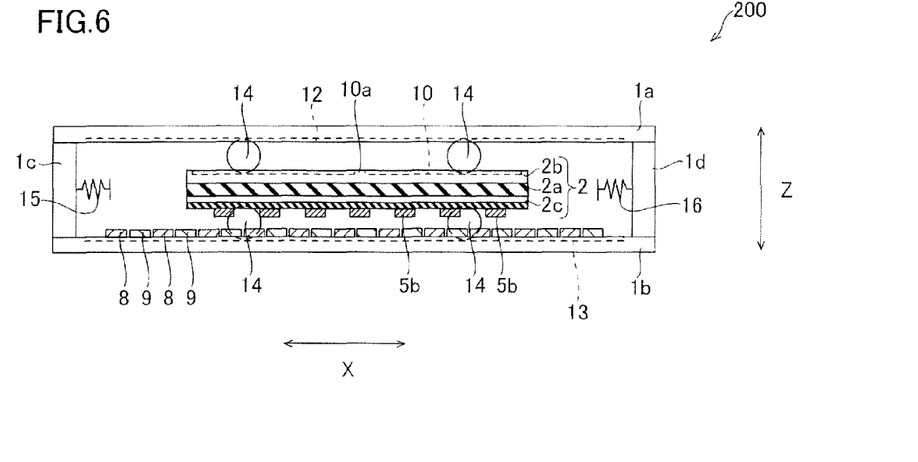
FIG. 6 A sectional view showing a power generating apparatus according to a second embodiment of the present invention.

A power generating apparatus 200 according to a second embodiment of the present invention is now described with reference to FIG. 6. The power generating apparatus 200 is so formed that power generation is performed only between a movable substrate 2c and a lower substrate 1b, dissimilarly to the structure of the power generating apparatus 100 according to the aforementioned first embodiment. In other words, this is such a structure that power generation is performed by an electret 4 and collecting electrodes 8 and 9.

The remaining structure and the remaining operation of the power generating apparatus 200 according to the second embodiment are similar to those of the aforementioned first embodiment.

According to the second embodiment, as hereinabove described, the electret 4 is arranged only on the movable substrate 2c of a movable portion 2 slidingly moving with respect to a fixed portion 1, while the collecting electrodes 8 and 9 are arranged only on the lower substrate 1b of the fixed portion 1. Also in the case of such a structure, the movable portion 2 slidingly moves in a direction X while being inhibited from movement in a direction Z, whereby a stable quantity of power generation can be obtained similarly to the aforementioned first embodiment.

The remaining effects of the second embodiment are similar to those of the aforementioned first embodiment.

(Third Embodiment)

Figure 7:
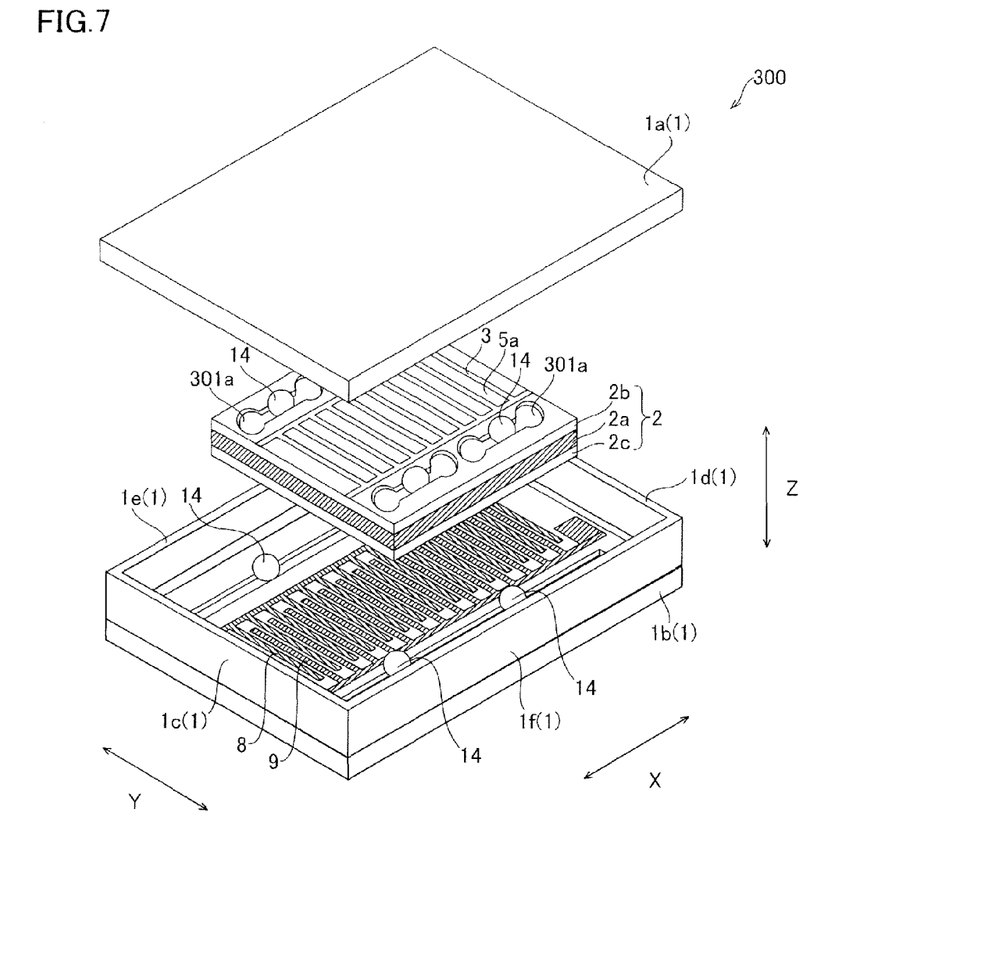
FIG. 7 A perspective view for illustrating a power generating apparatus according to a third embodiment of the present invention.
Figure 8:
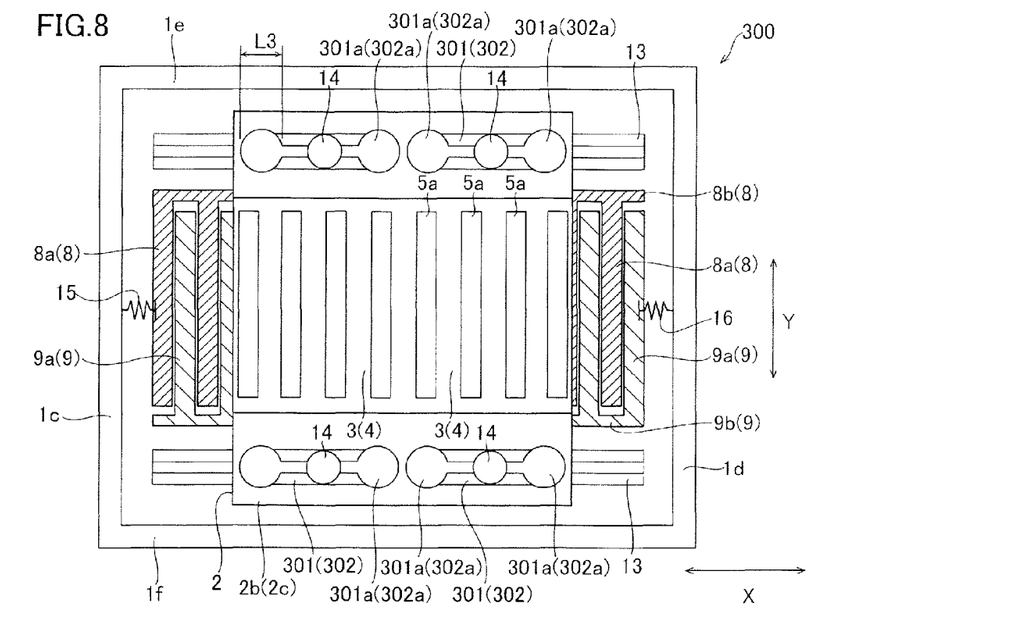
FIG. 8 A plan view of a fixed portion according to the power generating apparatus in the third embodiment of the present invention in a state removing an upper substrate.

A power generating apparatus 300 according to a third embodiment of the present invention is now described with reference to FIGS. 7 to 9. In the power generating apparatus 300, respective end portions 301a of groove portions 301 of a movable substrate 2b on a direction X side are formed in round shapes having a diameter larger than the diameter of ball bearings 14 respectively, as shown in FIGS. 7 and 8. More specifically, the diameter L2 (see FIG. 3) of the ball bearings 14 is about 300 μm, while the diameter L3 of the round shape portions of the end portions 301a on both sides of the groove portions 301 is formed to be about 450 μm. Similarly, respective end portions 302a of groove portions 302 of a movable substrate 2c on the direction X side are also formed in round shapes having a diameter of about 450 μm.

Figure 9:
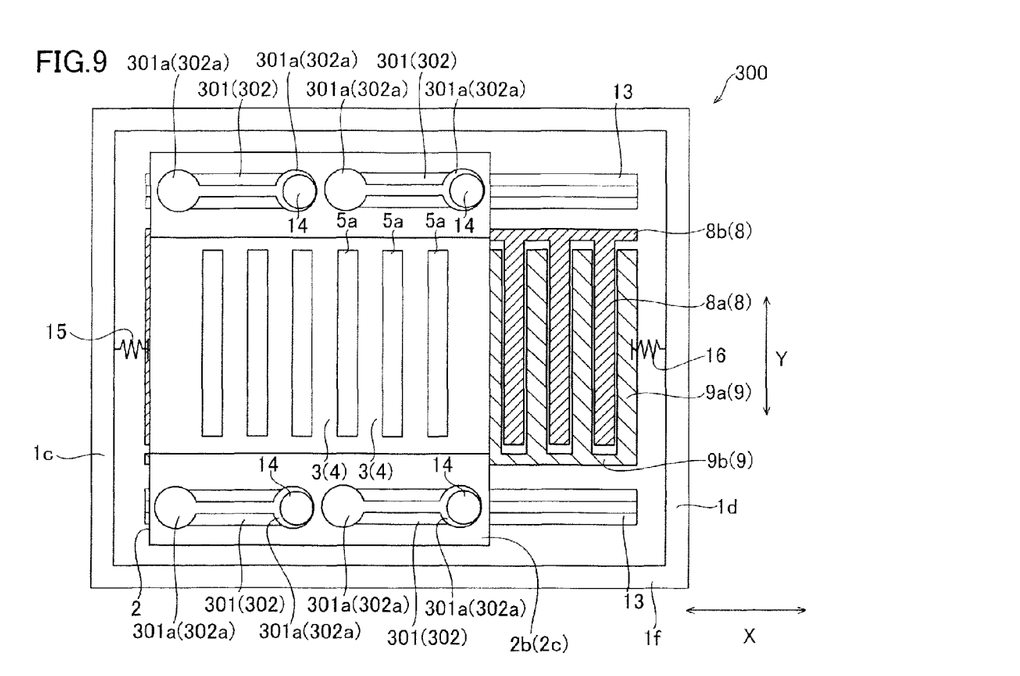
FIG. 9 A plan view for illustrating a power generating operation of the power generating apparatus according to the third embodiment of the present invention.

When the movable portion 2 slidingly moves up to the vicinity of a sidewall portion 1c or a sidewall portion 1d of the fixed portion 1 as shown in FIG. 9, the respective ball bearings 14 fit in the end portions 301a of the groove portions 301 and the end portions 302a of the groove portions 302 respectively, and are formed to be rotatable along inner edge sides of the round shape portions.

The remaining structure of the power generating apparatus 300 according to the third embodiment is similar to that of the aforementioned first embodiment.

According to the third embodiment, as hereinabove described, the end portions 301a of the groove portions 301 of the movable substrate 2b and the end portions 302a of the groove portions 302 of the movable substrate 2c are formed in the round shapes having the diameter L3 larger than the diameter L2 of the ball bearings 14 respectively, whereby the end portions 301a and 302a can function as clearance regions for the ball bearings 14. When the movable portion 2 moves from an end portion of the fixed portion 1 to an end portion in the opposite direction at this time, the ball bearings 14 can be guided from the end portions 301a and 302a toward the sides of the groove portions 301 and 302 while the inner edge portions of the round shapes of the end portions 301a and 302a function as guides for the ball bearings 14. Therefore, catches of the ball bearings 14 on the portions of the end portions 301a and 302a can be suppressed as compared with a case of rectangularly forming the respective end portions, for example, whereby the movable portion 2 can be more stably vibrated. Thus, a more stable quantity of power generation can be obtained.

The effects of the third embodiment are similar to those of the aforementioned first embodiment.

(Fourth Embodiment)

Figure 10:
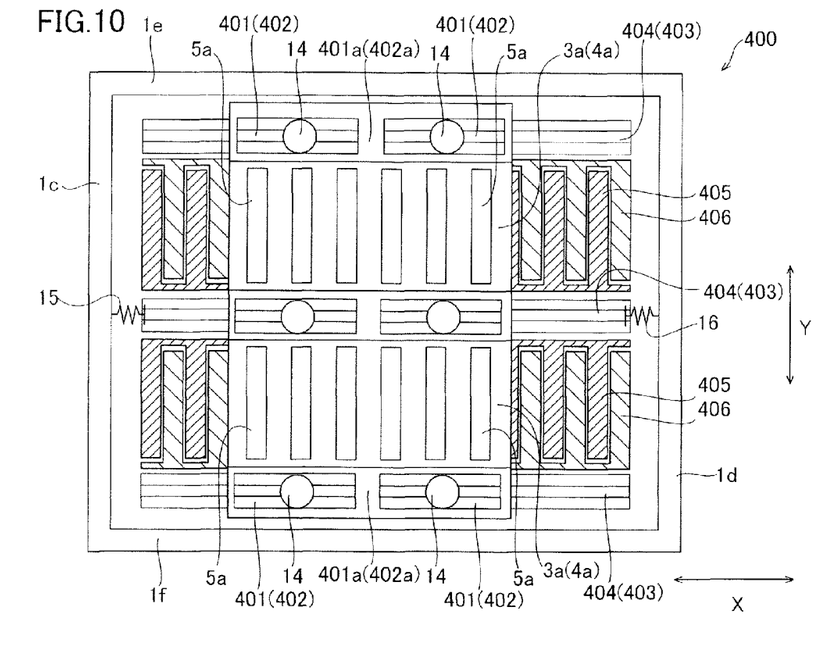
FIG. 10 A plan view of a fixed portion according to a power generating apparatus in a fourth embodiment of the present invention in a state removing an upper substrate.

A power generating apparatus 400 according to a fourth embodiment of the present invention is now described with reference to FIG. 10. In the power generating apparatus 400, three groove portions 401 extending in a direction X and including regulating portions 401a are formed on a movable substrate 2b parallelly along a direction Y. Electrets 3a are arranged between the respective groove portions 401 parallelly formed by three respectively. Similarly, three groove portions 402 extending in the direction X and including regulating portions 402a are formed on a movable substrate 2c parallelly along the direction Y. Electrets 4a are arranged between the respective groove portions 402 respectively. In an upper substrate 1a and a lower substrate 1b of a fixed portion 1, three groove portions 403 and three groove portions 404 are formed on positions overlapping the groove portions 401 and 402 of the movable portion 2 on the same lines in plan view parallelly along the direction Y. Collecting electrodes 405 and 406 having interdigital shapes are arranged between the groove portions 403 of the upper substrate 1a and between the groove portions 404 of the lower substrate 1b respectively. Further, ball bearings 14 are arranged one by one between the groove portions 401 and the groove portions 403 opposed to each other and between the groove portions 402 and the groove portions 404 respectively.

The remaining structure and the remaining operation of the power generating apparatus 400 according to the fourth embodiment are similar to those of the aforementioned first embodiment.

According to the fourth embodiment, as hereinabove described, the three groove portions 401 and the three groove portions 402 of the movable portion 2 as well as the three groove portions 403 and the three groove portions 404 of the fixed portion 1 are parallelly arranged along the direction Y respectively while the ball bearings 14 are arranged every groove portions opposed to each other respectively, whereby the movable portion 2 can be supported by a larger number of ball bearings 14. Therefore, the movable portion 2 can be more stably operated, whereby a stable quantity of power generation can be obtained.

The remaining effects of the fourth embodiment are similar to those of the aforementioned first embodiment.

(Fifth Embodiment)

A power generating apparatus 500 according to a fifth embodiment of the present invention is now described with reference to FIGS. 11 to 13. In relation to the fifth embodiment, a structure of the power generating apparatus 500 comprising such a sliding mechanism that a sliding portion moves along a rail portion is described, dissimilarly to the first to fourth embodiments comprising the sliding mechanisms consisting of the ball bearings and the groove portions.

Figure 11:
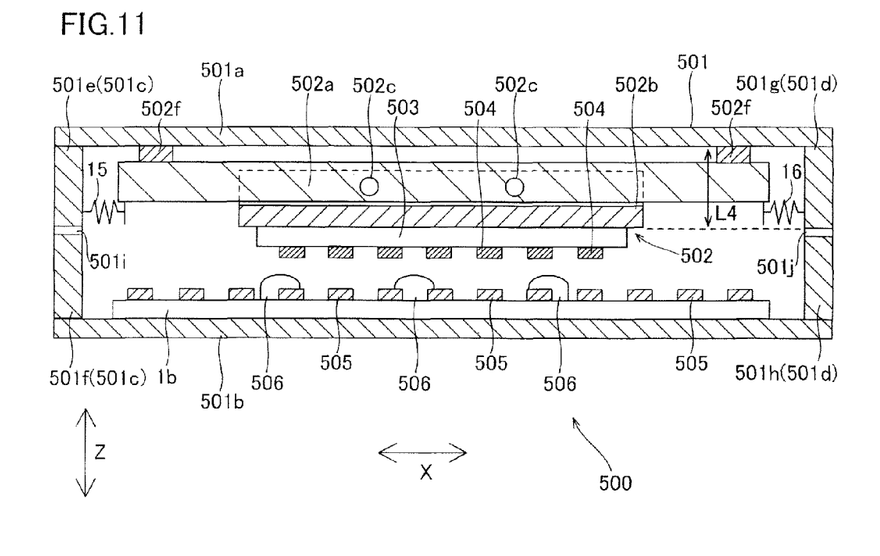
FIG. 11 A sectional view showing a power generating apparatus according to a fifth embodiment of the present invention.

The power generating apparatus 500 comprises a housing 501 as a fixed portion including an upper housing 501a, a lower housing 501b and sidewall portions 501c and 501d and a sliding mechanism 502 arranged to be slidingly movable in the housing 501, as shown in FIG. 11. The sidewall portion 501c is constituted of an upper sidewall portion 501e and a lower sidewall portion 501f. The sidewall portion 501d is constituted of an upper sidewall portion 501g and a lower sidewall portion 501h.

Figure 12:
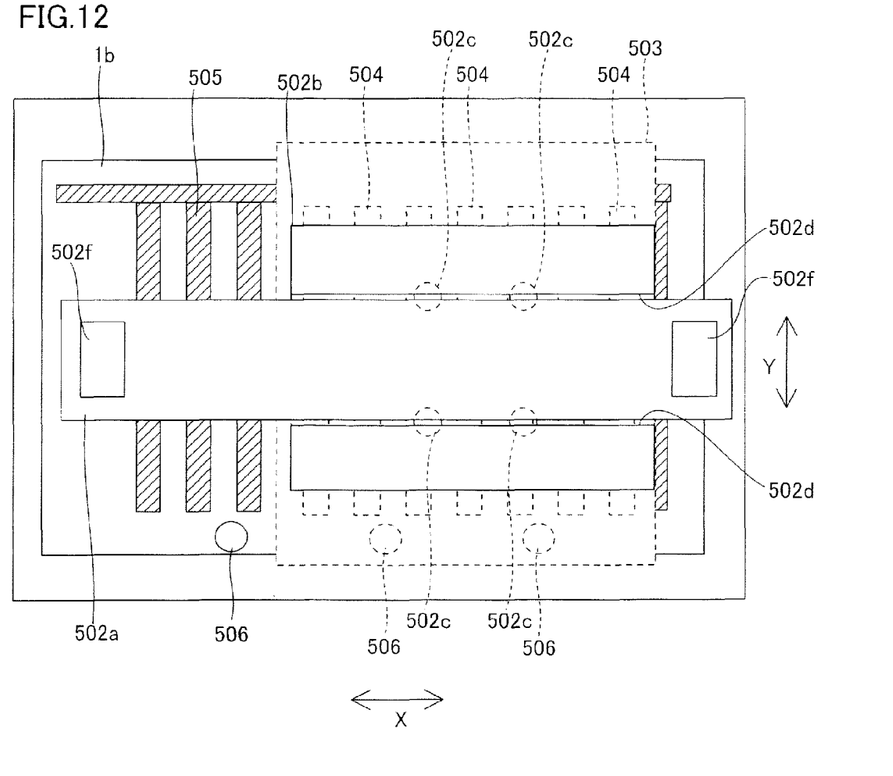
FIG. 12 A plan view showing the power generating apparatus according to the fifth embodiment of the present invention.
Figure 13:
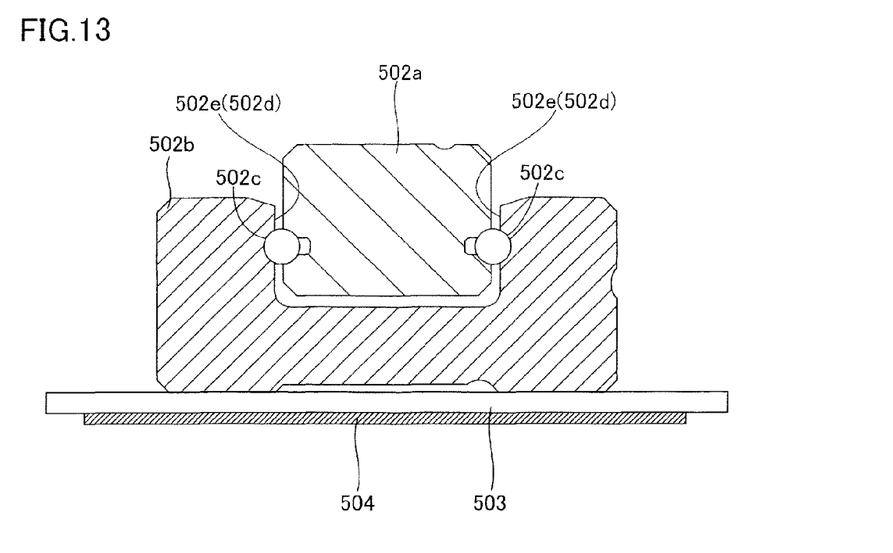
FIG. 13 A diagram showing a sliding mechanism in the power generating apparatus according to the fifth embodiment of the present invention.

The sliding mechanism 502 is constituted of a rail portion 502a, a sliding portion 502b and ball bearings 502c, as shown in FIGS. 12 and 13. The rail portion 502a is linearly formed to extend in a direction of arrow X. A groove portion 502d is formed in the sliding portion 502b, and the rail portion 502a is arranged to be covered with the groove portion 502d. Two pairs of ball bearings 502c are arranged between outer side surfaces of the rail portion 502a and inner side surfaces 502e of the groove portion 502d respectively.

A movable substrate 503 integrally slidingly moving with the sliding portion 502b is arranged on the surface of a side of the sliding portion 502b opposed to the lower housing 501b. A plurality of electrets 504 are formed on the surface of the movable substrate 503. Support members 502f are arranged on both end portions of the rail portion 502a respectively, while the respective support members 502f are fixedly mounted on the back surface side of the upper housing 501a. Thus, the sliding portion 502b is formed to be linearly movable in the direction of arrow X along the rail portion 502a. A lower substrate 1b is arranged on the surface of the lower housing 501b, while a collecting electrode 505 having an interdigital shape is arranged on the surface of the lower substrate 1b.

Stopper members 506 are provided on the surface of the lower substrate 1b. The stopper members 506 have functions of inhibiting the electrets 504 of the movable substrate 1 from approaching the collecting electrode 505 of the fixed portion 1 in excess of a prescribed distance. The stopper members 506 are plurally provided on an end portion of the surface of the lower substrate 1b not provided with the collecting electrode 505, and formed to extend in a direction Z (vertical direction).

Spacers 501i and 501j are provided between the upper sidewall portion 501e and the lower sidewall portion 501f and between the upper sidewall portion 501g and the lower sidewall portion 501h respectively. The length of the upper sidewall portions 501e and 501g is set to be equal to the length (L4) from the back surface of the upper housing 51a to the surface of the sliding portion 502b on which the lower substrate 1b is arranged. Thus, when changing the thickness of the electrets 504 and the thickness of the lower substrate 1b, it is possible to keep the interval between the electrets 504 and the collecting electrode 505 constant by adjusting the thickness of the spacers 501i a 501j by the changes in these thicknesses. Further, it is possible to adjust the interval between the electrets 504 and the collecting electrode 505 only by adjustment of the thickness of the spacers 501i and 501j.

The remaining structure and the remaining operation of the fifth embodiment are similar to those of the aforementioned first embodiment.

According to the fifth embodiment, as hereinabove described, the sliding mechanism is so formed that the sliding portion 502b is slidingly movable in the direction X along the rail portion 502a and the lower substrate 1b is arranged on the surface of the sliding portion 502b so that the electrets 504 and the collecting electrode 505 can be inhibited from approaching each other in excess of the prescribed distance, whereby a stable quantity of power generation can be obtained.

Further, the stopper members 506 are so provided on the fixed portion 1 that the electrets 504 and the collecting electrode 505 can be inhibited from approaching each other in excess of the prescribed distance, whereby circuits can be inhibited from shorting due to contact between the electrets 504 and the collecting electrode 505.

The remaining effects of the fifth embodiment are similar to those of the first embodiment.

The embodiments disclosed this time must be considered as illustrative in all points and not restrictive. The scope of the present invention is shown not by the above description of the embodiments but by the scope of claims for patent, and all modifications within the meaning and range equivalent to the scope of claims for patent are included.

For example, while the example of providing the electrets on the side of the movable portion and providing the collecting electrode(s) on the side of the fixed portion has been shown in each of the aforementioned first to fifth embodiments, the present invention is not restricted to this, but the electrets may be provided on the side of the fixed portion while providing the collecting electrode(s) on the side of the movable portion.

While the example of providing the spring members for receiving the movable portion slidingly moving to the vicinity of the sidewall portion of the fixed portion and applying the elastic forces in the directions toward the central portion of the fixed portion to the movable portion has been shown in each of the aforementioned first to fifth embodiments, the present invention is not restricted to this, but elastic members such as rubber members, for example, other than the spring members may be provided.

While the example of constituting the sliding mechanisms of the groove portions and the ball bearings arranged on the groove portions has been shown in each of the aforementioned first to fourth embodiments, the present invention is not restricted to this, but sliding mechanisms other than the ball bearings may be employed. In this case, a case of providing concaved groove portions and convexed rail portions extending in the direction X on the fixed portion and the movable portion and forming the same slidingly movable in the direction X by engaging the groove portions and the rail portions with each other or the like is conceivable, for example.

While the example of rendering the magnitude of the width between the opening end portions of the groove portions where the ball bearings are arranged larger than the diameter of the ball bearings has been shown in each of the aforementioned first to fourth embodiments, the present invention is not restricted to this, but the same may be smaller than or substantially identical to the diameter of the ball bearings so far as the ball bearings can be slidingly movably retained between the groove portions.

While the example of forming the groove portions so that the width thereof enlarges from the bottom portions toward the opening end portions has been shown in each of the aforementioned first to fourth embodiments, the present invention is not restricted to this, but the magnitude of the width of the groove portions may be constant. Further, the groove portions may be circular in response to the shape of the ball bearings.

While the example of dividing each groove portion into two and providing one regulating portion each has been shown in each of the aforementioned first to fourth embodiments, the present invention is not restricted to this, but at least two regulating portions may be provided each while dividing each groove portion into at least three. Thus, the ball bearings are arranged on the respective groove portions each divided into three, for example, respectively, whereby a more stable operation is enabled as compared with the case of dividing each groove portion into two. Further, it is possible to obtain a higher quantity of power generation by dividing each groove portion by a proper number. This is because the quantity of movement of the movable portion is inhibited from reduction resulting from excess division of the groove portion, for example.

While the example of mounting the spring members on the sidewall portions of the fixed portion thereby applying the elastic forces in the directions toward the central portion of the fixed portion to the movable portion when the movable portion comes into contact with the spring members has been shown in each of the aforementioned first to fourth embodiments, the present invention is not restricted to this, but another end portion may be mounted on the movable portion while mounting one end portion of the spring member on the fixed portion in the state where the movable portion is slidingly movably supported by the ball bearings.

While the example of forming three groove portions parallelly in the direction Y has been shown in the aforementioned fourth embodiment, the present invention is not restricted to this, but at least four groove portions may be formed parallelly in the direction Y.

While such an example that each sidewall portion is constituted of the two sidewall portions including the upper sidewall portion and the lower sidewall portion has been shown in the fifth embodiment, the present invention is not restricted to this, but each sidewall portion may be constituted of one sidewall portion.

While the example of providing the plurality of stopper members on the surface of the lower substrate of the fixed portion has been shown in the fifth embodiment, the present invention is not restricted to this, but at least one or more stopper members may be provided. Further, stopper members may be provided on the structures of the aforementioned first to fourth embodiments.

The invention claimed is:

1. A power generating apparatus comprising:
a first substrate (2b, 2c) provided with a first electrode (3) on one surface;
a second substrate (1a) including a second electrode (6) arranged to be opposed to said first electrode; and
a sliding mechanism (10, 11, 12, 13, 14) provided on at least either one surface side or another surface side of said first substrate,
wherein said sliding mechanism is so formed as to retain said first substrate to be relatively movable with respect to said second substrate in a second direction along one surface of said first substrate while inhibiting the same from moving in a first direction orthogonal to the surface on which said first electrode is arranged, and
said sliding mechanism includes a ball bearing arranged between said first substrate and said second substrate, and a first groove portion provided on one surface side of said first substrate so that said ball bearing is movably arranged thereon, and said first groove portion extends in said second direction so that said ball bearing is movable in said second direction, and the width of opening end portion of said first groove portion is larger than the diameter of said ball bearing so that a clearance region capable of absorbing an impact in a direction orthogonal to said second direction in plan view is provided between said ball bearing and said first groove portion.

2. The power generating apparatus according to claim 1, further comprising a third substrate (1b) arranged to be opposed to another surface of said first substrate, wherein said sliding mechanism at least includes ball bearings (14) arranged on both of one surface side and another surface side of said first substrate, and said first substrate is movably retained to be held between said second substrate and said third substrate through said ball bearings.

3. The power generating apparatus according to claim 1, wherein at least one groove portion of the first groove portion and the second groove portion of said first substrate further includes a movement regulating portion (10a, 11a) provided on an end portion in said second direction for regulating the moving range of said ball bearings, and said movement regulating portion is arranged to divide said first groove portion in said second direction.

4. The power generating apparatus according to claim 1, wherein the groove portions of said sliding mechanism are so formed that the width thereof enlarges from bottom portions toward opening end portions.

5. The power generating apparatus according to claim 1, wherein said second substrate includes a third groove portion (12) provided on a position opposed to said first groove portion of one surface side of said first substrate to extend in said second direction, and said third substrate includes a fourth groove portion (13) provided on a position opposed to said second groove portion of another surface side of said first substrate to extend in said second direction.

6. The power generating apparatus according to claim 1, wherein said first electrode is formed to extend in a direction orthogonal to said second direction which is a direction where said first substrate and said second substrate relatively move, and said first groove portions extending in said second direction are plurally arranged to hold said first electrode therebetween in plan view.

7. The power generating apparatus according to claim 1, wherein an end portion (60a) of at least said first groove portion along said second direction has a substantially round shape having a larger diameter than said ball bearings.

8. The power generating apparatus according to claim 1, wherein at least said first groove portions are arranged by at least three along a direction orthogonal to said second direction on said first substrate in plan view.

9. The power generating apparatus according to claim 1, further comprising a third substrate arranged to be opposed to another surface of said first substrate, wherein said third substrate includes a third electrode (8, 9) formed on a surface of a side opposed to another surface of said first substrate, and said first substrate further includes a fourth electrode (4) provided on another surface side of said first substrate.

10. The power generating apparatus according to claim 9, wherein one electrode of said third electrode and said fourth electrode is an electret, and another electrode is a collecting electrode.

11. The power generating apparatus according to claim 1, further comprising a third substrate arranged to be opposed to another surface of said first substrate, wherein said sliding mechanism includes at least one rail portion (502a) fixedly mounted on said third substrate, a sliding portion (502b) mounted on a surface opposed to the surface of said first substrate on which the first electrode is arranged to be retained by said rail portion and to slidingly move along said rail portion, and a ball bearing arranged between said rail portion and said sliding portion.

12. The power generating apparatus according to claim 1, wherein one electrode of said first electrode and said second electrode is an electret, and another electrode is a collecting electrode.

13. The power generating apparatus according to claim 1, wherein said first electrode includes first electrode portions (3) plurally arranged on said first substrate, said second electrode includes second electrode portions (6a) plurally arranged on said second substrate opposed to said first substrate, and the apparatus is so formed that power is generated by movement of said first electrode portions over a plurality of said second electrode portions when said first substrate and said second substrate relatively slidingly move.

14. The power generating apparatus according to claim 13, wherein said second electrode portions of said second electrode are plurally arranged at intervals along said second direction, said second electrode includes a coupling portion (6b) coupling said plurality of second electrode portions with each other, and said second electrode is interdigitally formed by said coupling portion and said plurality of second electrode portions coupled with each other by said coupling portion.

15. The power generating apparatus according to claim 14, wherein said second substrate further includes a fifth electrode (7) arranged on a surface on which said second electrode is provided and interdigitally formed, and said second electrode and said fifth electrode are so arranged that mutual interdigital portions are alternately adjacent to each other.

16. The power generating apparatus according to claim 1, further comprising a third substrate arranged to be opposed to another surface of said first substrate, wherein said second substrate and said third substrate are fixedly arranged fixed portions (1), and said first substrate is a movable portion (2) formed to be movable with respect to said second substrate and said third substrate in said second direction by said sliding mechanism.

17. The power generating apparatus according to claim 1, further comprising a spring member applying an elastic force in said second direction to said first substrate.

\* \* \* \* \*